United States Patent [19]

Tanaka et al.

[11] 4,154,266

[45] May 15, 1979

[54] FLOATING CARGO HOSE

[75] Inventors: Mamoru Tanaka; Keizo Tatsunami; Mitsugu Makise, all of Yokohama, Japan

[73] Assignee: Bridgestone Tire Company Limited, Tokyo, Japan

[21] Appl. No.: 846,475

[22] Filed: Oct. 28, 1977

[30] Foreign Application Priority Data

Nov. 2, 1976 [JP] Japan ................................. 51/132205

[51] Int. Cl.² ............................................. F16L 11/12
[52] U.S. Cl. ................................... 138/109; 138/137; 138/DIG. 9
[58] Field of Search ............... 138/137, 101, 103, 153, 138/149, DIG. 9, 109; 61/112; 9/8 R; 174/101.5

[56] References Cited

U.S. PATENT DOCUMENTS

| | | | |
|---|---|---|---|
| 3,548,884 | 12/1970 | Ambrose | 138/153 |
| 3,811,477 | 5/1974 | Thawley | 138/103 |
| 3,902,531 | 9/1975 | Thawley | 138/103 |
| 3,972,354 | 8/1976 | Champleboux et al. | 138/103 |

*Primary Examiner*—Lenard A. Footland
*Attorney, Agent, or Firm*—Sughrue, Rothwell, Mion, Zinn and Macpeak

[57] ABSTRACT

A floating cargo hose for transporting fluid from a vessel having an excellent abrasion resistance and a unique distinct color of colored urethane is manufactured by wrapping a hose body in which is embedded a fibrous sheet or a spiral wire in rubber with a sponge layer having closed cells, covering the sponge layer with a first rubber cover in which is embedded a fibrous sheet and vulcanizing the rubber, treating the first rubber cover to promote adhesion and coating the thus treated first rubber cover with a liquid urethane rubber and curing the liquid urethane rubber to form a second cover.

3 Claims, 1 Drawing Figure

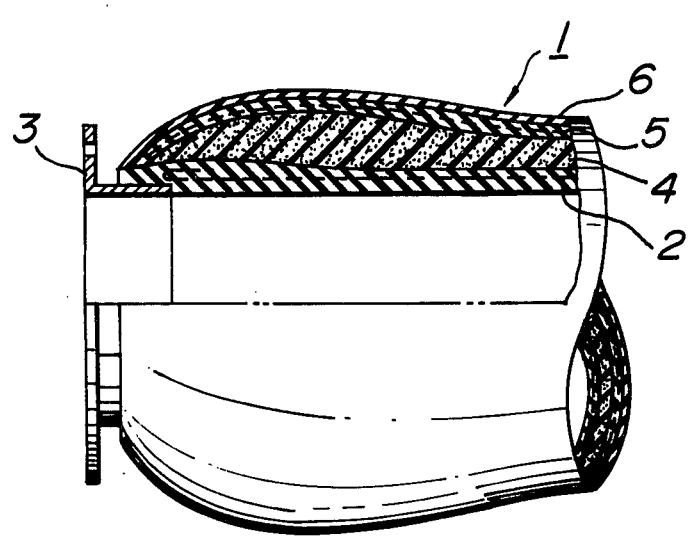

FLOATING CARGO HOSE

The present invention relates to cargo hoses to be used for transporting cargo, such as crude oil and the like from a vessel and a method for producing the same.

The conventional cargo hose is floated on sea by surrounding an outer surface of a hose body formed by embedding a wire or a fibrous sheet in a rubber with a float formed by filling polyurethane foam and covering said foam with an outer shell composed of a rigid material. However, such a float must be constructed in the field and is laborious.

Therefore, a floating unitary type cargo hose has been developed in which the outer surface of the hose body is wrapped with a rubber or synthetic resin sponge and then the outer surface of the rubber or synthetic resin sponge is covered with a rubber. However, the floating unitary type cargo hoses developed heretofore have used ordinary rubbers, such as natural rubber, styrene butadiene rubber, chloroprene rubber and the like as the cover so that, during vulcanizing the rubber, the outer surface is clamped with a wrapping tape and then the vulcanization is effected under pressure however, as the inner layer is sponge, it is impossible to make the clamping force large so that the adhesion of the rubber to the sponge layer is thus insufficient. Further the trace of the wrapping tape readily forms unevenness on the rubber surface and therefore when the tanker comes in contact with the hose or the hoses contact each other during use, the hose skin is apt to be damaged. Typically the end hose which is directly connected to a manifold of the tanker has only about one-half year to one year of durable life.

The present invention, with an object of eliminating the drawbacks of conventional techniques, resides in the following points.

The present invention relates to a floating cargo hose having a hose body in which is embedded a fibrous sheet, a spiral wire or the like in a rubber and a connecting flange are integrated, characterized in that an outer surface of the hose body is wrapped with a sponge layer having closed cells, the outer surface of the sponge layer is covered with a first cover of rubber in which a fibrous sheet is embedded following which the outer surface of the first cover is coated with a liquid urethane rubber and the urethane rubber is cured to form a second cover.

Furthermore, the present invention relates to a method for producing a floating cargo hose, which includes wrapping the outer surface of the hose body integrated with the connecting flange with a sponge having closed cells, covering the outer surface of the sponge layer with the first cover of rubber in which a fibrous sheet is embedded and vulcanizing said rubber, subjecting the outer surface of the first cover to an adhering treatment, coating a liquid urethane rubber on the thus treated outer surface and curing the urethane rubber to form the second cover.

The present invention will be explained in more detail with reference to the accompanying drawing:

The sole FIGURE shows a partial sectional view of a hose constructed in accordance with the present invention.

In the sole FIGURE, 1 includes a floating cargo hose where an end of the hose body 2 in which is embedded a fibrous sheet or a spiral wire in a rubber and forms a unitary body with a connecting flange 3. The outer surface of the hose body 2 is wrapped with a sponge having closed cells, which acts as the floating material when being used at sea. The outer surface of the sponge layer is covered with a first cover 5 of rubber in which a fibrous sheet is embedded. In order to cover the sponge layer with the first cover, a rubber adhesive, for example, a solution in toluene of the same rubber as in the first cover is applied on the outer surface of the sponge 4 and then a rubber sheet, a fibrous sheet and a rubber sheet are laminated in that order on the outer surface of the sponge 4.

After covering with the first cover, the outer surface of the first cover is wrapped with wrapping tape and then the rubber of the first cover is vulcanized in a steam oven. After vulcanization, the wrapping tape is unwound and the outer surface of the vulcanized first cover is subjected to an adhering treatment. The treating process comprises preferably treating the outer surface of the first cover by brushing, spraying, immersing or the like with an acidic solution selected from inorganic acids; organosulfonic acids and organic sulfuric acid esters having a pH less than 2.0; for example, inorganic acids, such as sulfuric acid, hydrochloric acid and the like; organosulfonic acids, such as paratoluenesulfonic acid, allylsulfonic acid, hydroxyethanesulfonic acid, dioctylsulfosaccinate and the like; organic sulfuric acid esters, such as octylsulfuric acid ester, isooctylsulfuric acid sulfonate and the like, by means of brush, spray, immersing and the like. These acid solutions may be used alone or in admixture. After the adhering treatment, a liquid urethane is applied on the outer surface and then naturally or heating cured to form the second cover 6. The above described urethane is preferably a water insoluble ether series urethane. The coating is effected as follows. A rotary member is inserted into the hose body and a warm urethane liquid having a viscosity of 600–1,500 c.p. is applied at a rate of 8–17 r.p.m. and then vulcanization is effected at a rate of 1–5 r.p.m. so that the urethane does not drop and there is no unevenness on the finished surface and a uniform layer can be obtained.

When the thickness of the first cover is 4–15 mm and the thickness of the second cover is 2–6 mm, a satisfactory durable life can be expected.

As explained above, in the floating cargo hose according to the present invention, urethane having an excellent abrasion resistance is provided on the outermost surface of the cargo hose, so that it is possible to prevent the damage of the hose due to the contact between adjacent hoses or impact of the hose and vessel. Abrasion resistance which has never been attained in the ordinary colored rubber can be obtained since the unique distinct reddish orange color of the colored urethane appears on the outer surface of the cargo hose. Discovery of the hose on sea is thus easy so that impact with vessel can be prevented. Furthermore, the first cover does not constitute the outermost layer of the cargo hose, so that even if the vulcanization of the first cover is insufficient and the rubber layer separates from the sponge layer and there is unevenness at the surface, because the outer layer is constituted of a urethane layer, the above described defects do affect a cargo hose constructed according to the invention. Moreover, urethane is much more abrasion resistant than ordinary rubber and is also more slippery.

The temperature of the invention cargo hose is less owing to less absorption of sun light than black rubber hoses and, moreover has a smooth surface so that the deposit of marine organisms is less.

According to the method for producing cargo hose of the present invention, the urethane constituting the second cover and the rubber layer of the outer surface of the first cover are adhered chemically, so that the urethane penetrates into the rubber layer and the strong adhesion is obtained.

What is claimed is:

1. A floating cargo hose for transporting a fluid having a rubber hose body in which is embedded a reinforcing layer integrated with a connecting flange, comprising:
    (1) a sponge layer having closed cells, which surrounds the hose body,
    (2) a first cover of vulcanized rubber, a fibrous sheet being embedded in said first cover, said first cover covering the outer surface of the sponge layer, and the outer surface of said first cover being treated with an acidic solution for promoting the adhesion of a subsequent layer of urethane rubber, and
    (3) a second cover surrounding the first cover, which is formed by coating a liquid urethane rubber on the outer surface of the first cover which was treated with an acidic solution and curing the liquid urethane rubber without the use of a wrapping layer.

2. The floating cargo hose as claimed in claim 1, wherein the urethane rubber of the second cover is an ether series urethane rubber.

3. The floating cargo hose as claimed in claim 1, wherein a thickness of the first cover is 4–15 mm and a thickness of the second cover is 2–6 mm.

* * * * *